US009688491B2

(12) United States Patent
Abbott et al.

(10) Patent No.: US 9,688,491 B2
(45) Date of Patent: Jun. 27, 2017

(54) APPARATUS FOR LOADING AND EVENLY DISTRIBUTING MATERIAL INTO A CONTAINER

(71) Applicant: JDV Equipment Corporation, Dover, NJ (US)

(72) Inventors: Robert Abbott, Montville, NJ (US); Don Kramer, Waterford, WI (US)

(73) Assignee: JDV Equipment Corporation, Dover, NJ (US)

( * ) Notice: Subject to any disclaimer, the term of this patent is extended or adjusted under 35 U.S.C. 154(b) by 1218 days.

(21) Appl. No.: 13/631,810

(22) Filed: Sep. 28, 2012

(65) Prior Publication Data
US 2014/0093341 A1 Apr. 3, 2014

(51) Int. Cl.
| B65G 69/04 | (2006.01) |
| B65G 67/10 | (2006.01) |
| B30B 11/24 | (2006.01) |
| B65G 69/00 | (2006.01) |
| B65G 69/20 | (2006.01) |

(52) U.S. Cl.
CPC ............. *B65G 69/00* (2013.01); *B30B 11/24* (2013.01); *B65G 69/04* (2013.01); *B65G 69/20* (2013.01)

(58) Field of Classification Search
CPC ........ B65G 65/32; B65G 65/46; B65G 67/10; B65G 69/00; B65G 69/04; B65G 69/20; B65G 69/0433; B65G 69/0458; B65G 88/12; B30B 9/06; B30B 9/062; B30B 9/08; B30B 9/12; B30B 9/14; B30B 15/32; B30B 11/24
See application file for complete search history.

(56) References Cited

U.S. PATENT DOCUMENTS

| 4,020,958 | A | * | 5/1977 | Wheeler | ................ | B65G 67/10 |
| | | | | | | 141/392 |
| 6,095,743 | A | | 8/2000 | Dudley | | |
| 6,530,199 | B1 | * | 3/2003 | Covington | ........... | A01D 46/084 |
| | | | | | | 100/177 |
| 6,733,663 | B1 | | 5/2004 | Simon et al. | | |
| 7,267,051 | B2 | * | 9/2007 | Richman | .............. | A01D 46/084 |
| | | | | | | 100/146 |

FOREIGN PATENT DOCUMENTS

| GB | 2440136 A | 1/2008 |
| JP | 60218235 A | 10/1985 |

OTHER PUBLICATIONS

European Search Report, EP Application 13185904.3-1707, mailed Nov. 29, 2013.
European Search Report, EP Application 13186313.6-1707, mailed Dec. 6, 2013.

* cited by examiner

*Primary Examiner* — Jimmy T Nguyen
(74) *Attorney, Agent, or Firm* — McDonnell Boehnen Hulbert & Berghoff LLP (57) ABSTRACT

An overhead material handling system and methods for its use are provided, where the system includes: (a) a compactor and (b) a leveler in communication with the compactor, where the leveler comprises (i) a cover, (ii) a trough, and (iii) a trigger, where the trough has a first end and a second end and the trough is rotatably-mounted between a first end of the cover and a second end of the cover.

17 Claims, 7 Drawing Sheets

APPARATUS FOR LOADING AND EVENLY DISTRIBUTING MATERIAL INTO A CONTAINER

BACKGROUND

A typical overhead material handling system may be configured to both deposit and distribute flowable material into an open-topped container. This type of system may be used to handle waste material, for instance. After the container has been filled with the desired amount of material, the container may be removed from under the overhead handling system and placed on the bed of a truck or otherwise coupled to a vehicle for transportation (hauling).

A leveler is typically used to aid in the even distribution of the material as the material is being deposited, or loaded, into the container, which can be quite long in length. Some overhead material handling systems include a support structure to support and lift the leveler for ease of removal of the container.

In the instance of the deposit of hazardous materials into a container, it is desirable to evenly distribute the material without the need for personnel to be exposed to the material. These hazardous materials may include sewage. For example, a wastewater stream at a treatment plant contains various types of suspended and floating solid material, also known as screenings. Treating wastewater involves the separation and removal of such screenings from the inbound sewage stream. The materials are captured on screens or racks and then transported and treated in a variety of ways, generally involving washing the screenings and returning free captured water to the stream. The screenings are then generally transported to a site for disposal or may be recycled or composted.

Furthermore, odor may build up within the container. It is desirable to contain the odor, as well as to prevent pests from being attracted to and entering the container and protect the container contents from the outdoor elements (e.g., snow, rain wind, and the like).

SUMMARY

This disclosure is generally directed to an apparatus and method for loading and evenly distributing material into a disposal container. The present invention provides an overhead material handling system that employs a rotatable trough to evenly discharge screening logs into a material hauling container. This capability allows the screening material to be tightly and precisely packed without re-fluffing the screening material after a dewatering process.

Thus, in a first aspect, an overhead material handling system is provided. The overhead material handling system comprises: (a) a compactor and (b) a leveler in communication with the compactor, where the leveler comprises (i) a cover, (ii) a trough, and (iii) a trigger, where the trough has a first end and a second end and the trough is rotatably-mounted between a first end of the cover and a second end of the cover.

In one embodiment, the overhead material handling system provides that the trough is mounted on a shaft. In this embodiment, a first end of the shaft and a second end of the shaft are each mounted in a roller bearing.

In an alternative embodiment, the first end and the second end of the trough are each coupled to one or more guide posts, where the first end and the second end of the cover each define a guiding channel, where the one or more guideposts at the trough's first end are disposed within the guiding channel defined in the cover's first end, and where the one or more guideposts at the trough's second end are disposed within the guiding channel defined in the cover's second end.

In another embodiment, the leveler further comprises a counterweight that extends along a longitudinal length of a base of the trough.

In still another embodiment, the trigger comprises a moveable plunger, where the trigger is axially mounted within the trough at the second end of the trough. In an alternative embodiment, the trigger comprises a sensor disposed at the second end of the trough.

In a further embodiment, the cover comprises four sidewalls and a top surface that is coupled to each sidewall, where the cover's top surface is flat, peaked or domed.

In yet another embodiment, the overhead material handling system further provides a washer, where the washer comprises a tank, a screw, a drive unit, at least one spray nozzle, a water discharge conduit, and a material discharge outlet, and where the compactor comprises an inlet, a housing, motorized compacting means for moving, compacting and dewatering materials within the housing, a water discharge conduit and an outlet, where the compactor's inlet is coupled to the material discharge outlet of the washer, and where the outlet of the compactor is coupled to one or both of the first end of the trough or the first end of the cover.

In one embodiment, the overhead material handling system further provides a feeding conveyor system for material transport in communication with the washer and a support structure pivotally supporting the cover and configured to move the leveler between a raised position and a lowered position, where in the lowered position the leveler is substantially parallel to a container. Here, at least one mechanical lifting mechanism may be coupled to the cover.

In another embodiment, the cover defines inspection ports.

In an additional embodiment, the overhead material handling system further comprises a vent system and an air filtration system in communication with the vent system, where the vent system is configured to reduce odor buildup from within the container, wherein the vent system is coupled to the cover.

In a second aspect, a method is provided for loading and evenly distributing material into a container using the overhead material handling system, where the method comprises: (a) moving, compacting and dewatering material in the compactor, (b) expelling compacted material into the first end of the trough, (c) driving expelled compacted material along the length of the trough toward the second end of the trough, (d) activating the trigger, (e) rotating the trough in a first direction from an upright position toward a first side of a container, (f) emptying the material from the trough into the first side of the container, (g) returning the trough to the upright position, (h) repeating steps (a) to (d), (i) rotating the trough in a second direction from the upright position toward a second side of the container, and (j) emptying the material from the trough into the second side of the container.

In one embodiment, the invention provides that the expelled compacted material is in the form of a substantially continuous log.

In another embodiment, the method further comprises the step of rolling the expelled material along one of a base of the container or a top surface of previously expelled compacted logs until the expelled material reaches one of the container's first side, the container's second side or a side of a previously expelled compacted log.

In a further embodiment, driving the expelled compacted material along the length of the trough toward the second end of the trough comprises: continuously expelling compacted material into the first end of the trough such that the compacted material is forced along a base of the trough.

In still another embodiment, activating the trigger comprises applying a force to a plunger via the expelled compacted material. In an alternative embodiment, activating the trigger comprises sensing the expelled compacted material via a sensor.

The foregoing summary is illustrative only, and is not intended to be in any way limiting. In addition to the illustrative aspects, embodiments, objectives and features described above, further aspects, embodiments, objectives and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In a first aspect, as shown in FIGS. 1-7, an exemplary overhead material handling system 10 is provided. The overhead material handling system comprises: (a) a compactor 17 and (b) a leveler 20 that comprises (i) a cover 25, (ii) a trough 30, and (iii) a trigger 35, where the trough 30 has a first end 31 and a second end 32 and the trough 30 is rotatably-mounted between a first end 26 of the cover 25 and a second end 27 of the cover 25.

As used herein, an "overhead material handling system" 10 is designed to be used with any type of material capable of being washed, dewatered and compacted. For example, the material may be any flowable (e.g., loose) material. In some examples, the material may be scrap pieces. In other examples, the material may be a biomaterial such as sludge or dirt. In other examples, the material may comprise wastewater screenings. Still other flowable materials may be used with the overhead material handling system 10.

As used herein, a "compactor" 17 comprises (i) an inlet 65, (ii) a housing 70, (iii) motorized compacting means for moving, compacting and dewatering materials within the housing, and (iv) an outlet 75. In some embodiments, a water discharge conduit may be coupled to the housing 70. The housing 70 receives material through its inlet 65 and advances that material through the body of the housing 70 via a compactor screw in communication with a pressing section or a conical or pinch valve (not shown). In some embodiments, the pressing section or the conical or pinch valve form a solid plug in a compression zone by reducing the cross-section of housing 70. This increases back pressure on the material in the housing 70 to force entrained water from the solids and out additional perforations or slots to achieve desired compaction of the material. A drive unit 80 includes a motor and gear reducer in communication with the compactor screw generate the necessary force to advance the materials through the housing 70. The horse power of the motor may vary depending on the type of materials required to be washed and/or compacted and ultimately advanced through the overhead material handling system 10.

As the compactor 17 compresses the material, water is optionally drained in a dewatering zone (not shown) and then out through the water discharge conduit. The compacted material is condensed by the pressing section or the conical or pinch valve preferably such that the compacted material would pass the Paint Filter Liquids Test Method 9095B issued by the EPA. The compacted material is then advanced through the outlet 75 and into the leveler 20.

In some embodiments, the overhead material handling system 10 may compact and advance materials without a washing cycle. In other embodiments, the overhead material handling system 10 employs a washer compactor 15. As used herein, a "washer compactor" 15 washes, dewaters and compacts material or screenings. The washer compacter 15 comprises a washer 16 and the compactor 17, described above, that may be arranged linearly, shown in FIGS. 1-4 and 6, or in stacked arrangement (not shown) such that the washer 16 is disposed above the compactor 17.

As used herein, a "washer" (again if we do not use washer can we just say compactor) 16 comprises (i) a tank 40 (not needed if not washer), (ii) a screw 45, (iii) a drive unit 80, (iv) at least one spray nozzle 50, (v) a water discharge conduit 55, and (vi) a material discharge outlet 60. The tank 40 defines a bottom surface and sidewalls and is sized to receive screenings. The tank 40 may range from about 6 inches to 48 inches in height, about 12 inches to 36 inches in width, and about 12 inches to 36 inches in length, and is preferably about 12 inches to 24 inches in height, about 12 inches to 18 inches in width, and about 24 inches to 36 inches in length. Further, in one embodiment, a feeding conveyor system 85 for material transport is in communication with the washer 16. The feeding conveyor system 85 may include a number of types of conveyors or feeder pipes and drive units known in the art to move any of the material types discussed herein. The feeding conveyor system 85 may continuously drop material or screenings into the open tank 40 from above.

The screw 45 is disposed within the tank 40 and may be shaft-mounted or shaftless. If the screw 45 is shaft-mounted, bearings may be utilized at each end of the shaft. The screw 45 is a spiral flange, preferably in the range from 4 inches to 16 inches in diameter, adapted to move material in a particular direction through the tank 40 as the screw 45 is rotated by the drive-unit 80. The drive unit 80 is coupled to the screw 45 and has a motor and drive mounted to one end of the tank 40. In another embodiment, the drive unit 80 may be coupled directly to the compactor screw. In operation, the screw 45 agitates and advances material forward towards the material discharge outlet 60, but may also operate in reverse if the material backs-up.

At least one spray nozzle 50 directs water into the tank 40 to wash the material being advanced by the screw 45. In one example embodiment, shown in FIGS. 1-4 and 6, a single spray nozzle 50 is employed at the end of the tank 40 that is coupled to the material discharge outlet 60. In another example embodiment, a plurality of spray nozzles 50 are spaced apart along the length of the tank 40. In each embodiment, the at least one spray nozzle 50 emits wash water at a pressure ranging from about 20 psi to 80 psi to ensure fecal matter and other organic material, for example, is adequately separated from the screenings.

The wash water and rinsed-off organics drain out through the water discharge conduit 55. Draining the wash water is the first part of the dewatering process that the material will undergo. The water discharge conduit 55 is coupled to the bottom surface of the tank 40, though in some embodiments it may be connected to one of the sidewalls of the tank 40, preferably at the end of the tank 40 coupled to the material discharge outlet 60 shown in FIG. 3.

In one embodiment, a graduated filtering system is employed in the tank 40 to prevent the material or screenings from clogging or blocking the water discharge conduit 55. This graduated filtering system may include (a) a first filter or screen defining a first set of holes or pores that is disposed immediately under the screw 45, (b) a second filter or screen defining a second set of holes or pores that are smaller than the first set of holes, where the second filter is disposed below and spaced apart from the first filter, and (c) a third filter or screen defining a third set of holes or pores that are smaller than the second set of holes, where the third filter is disposed directly over the water discharge conduit 55. The first, second and third sets of holes may range from about 1 mm to 6 mm. In an alternative embodiment, a single filter or screen may be disposed directly over the water discharge conduit 55, and the holes may range from about 1 mm to 3 mm.

In another embodiment, the washer 16 has a free draining zone with perforations or slots located directly under the material discharge outlet 60. The free draining zone can be cleaned by the scouring action of the screw 45 passing over the perforations or slots. In some embodiments, a brush is fastened to the screw 45 in the free draining zone to aid in the scouring action.

The material discharge outlet 60 is defined at one end of the tank 40. The rotating screw 45 of the washer portion 16 transfers the substantially drained material or screenings from the tank 40 through the material discharge outlet 60, which is coupled to the compactor's inlet 65.

Figure 1:
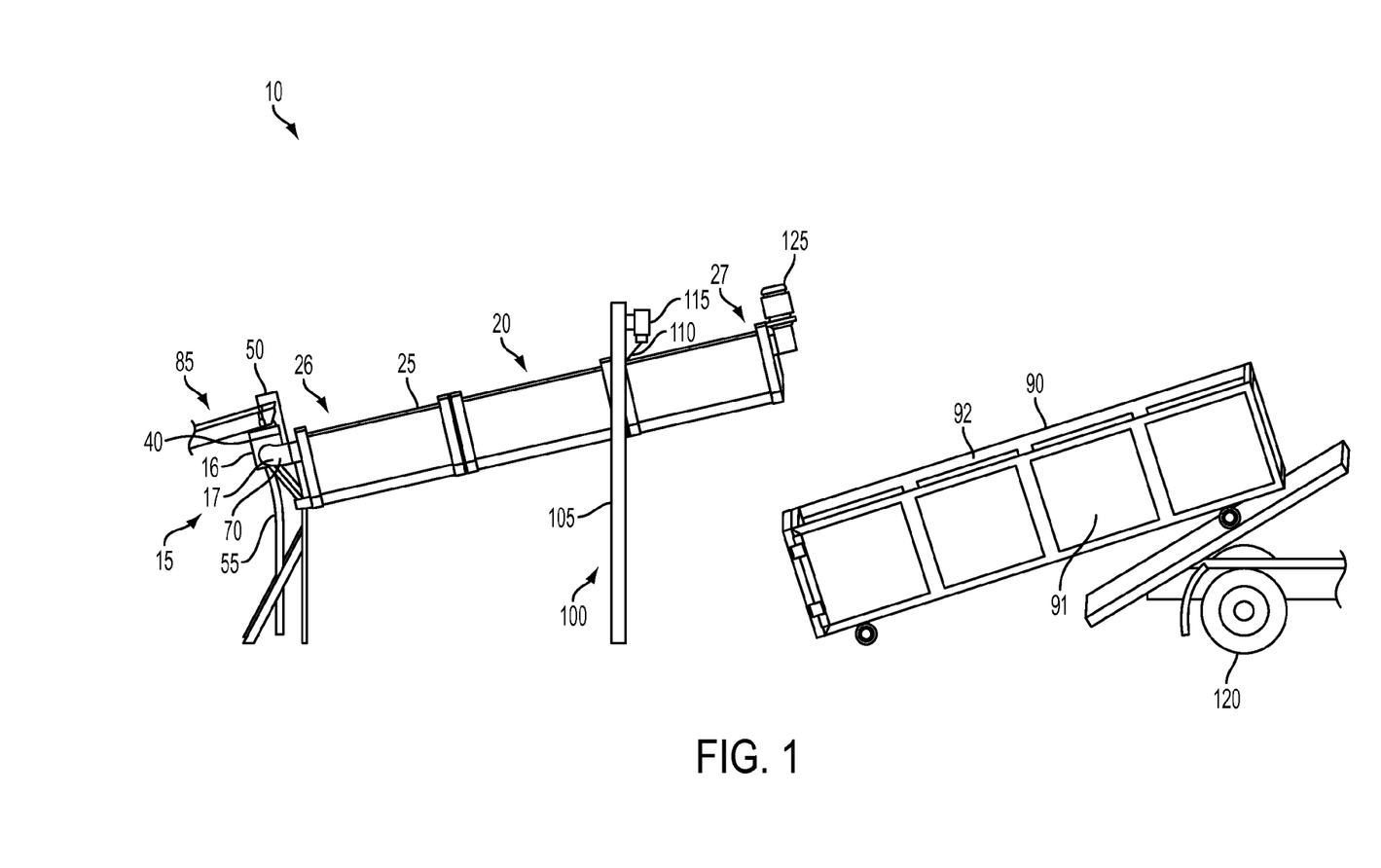
FIG. 1 is a side view of an example of an overhead material handling system in a raised position as an open-top container is being deposited from a roll-off container truck.
Figure 2:
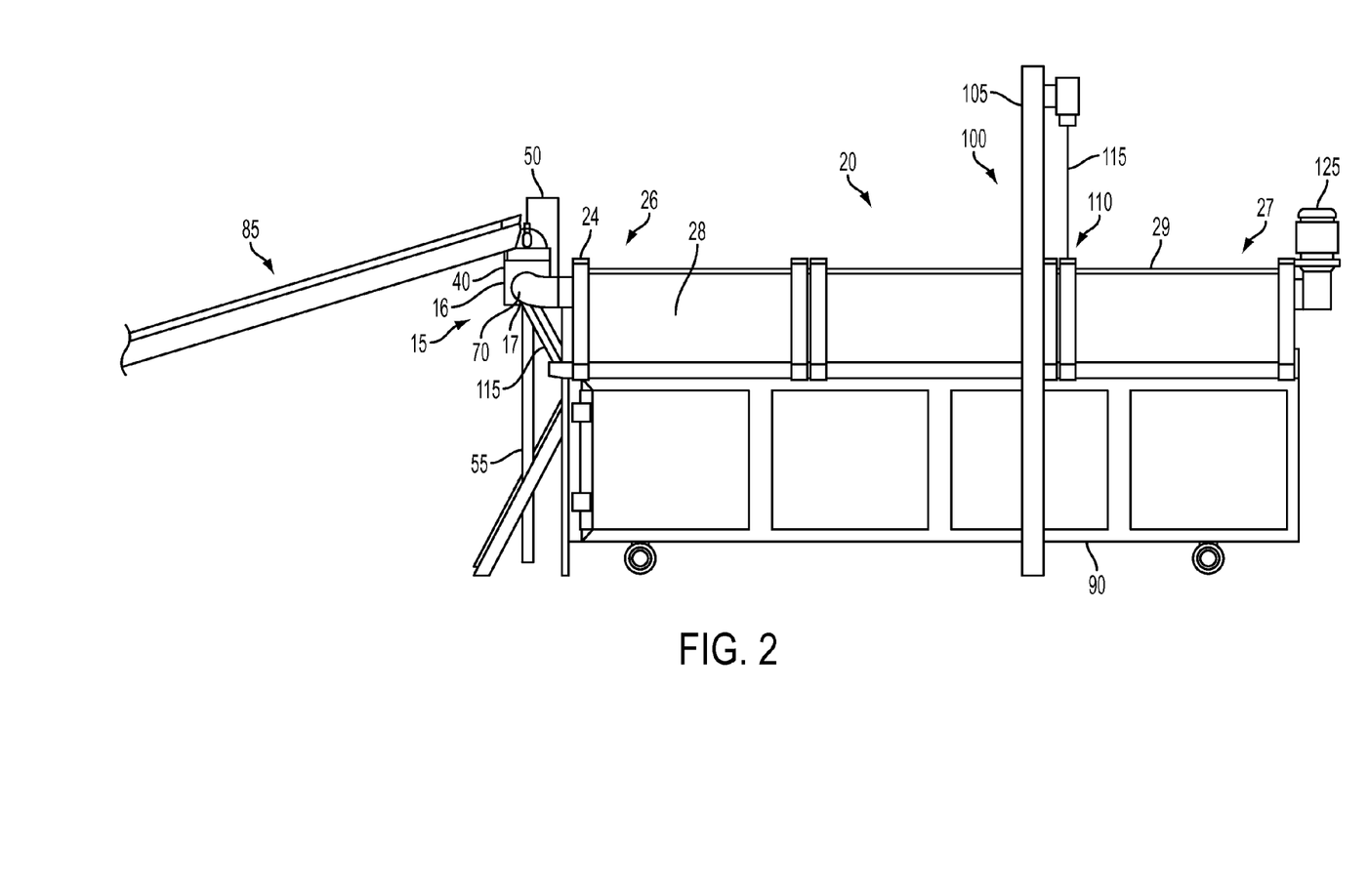
FIG. 2 is a side view of the overhead material handling system of FIG. 1 with the leveler in place on and parallel to the container.
Figure 3:
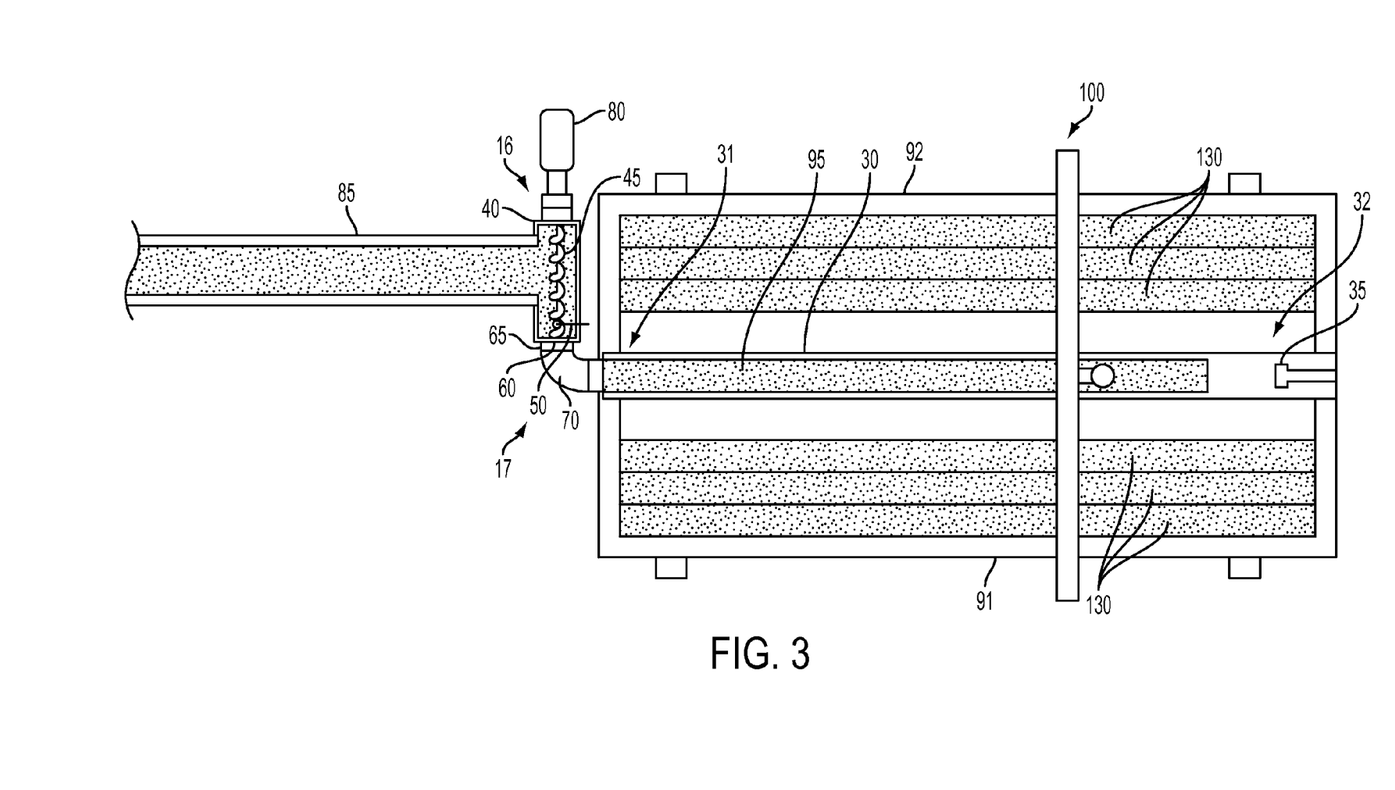
FIG. 3 is a top view of the overhead material handling system of FIG. 1 with the leveler in place on and parallel to the container.
Figure 4:
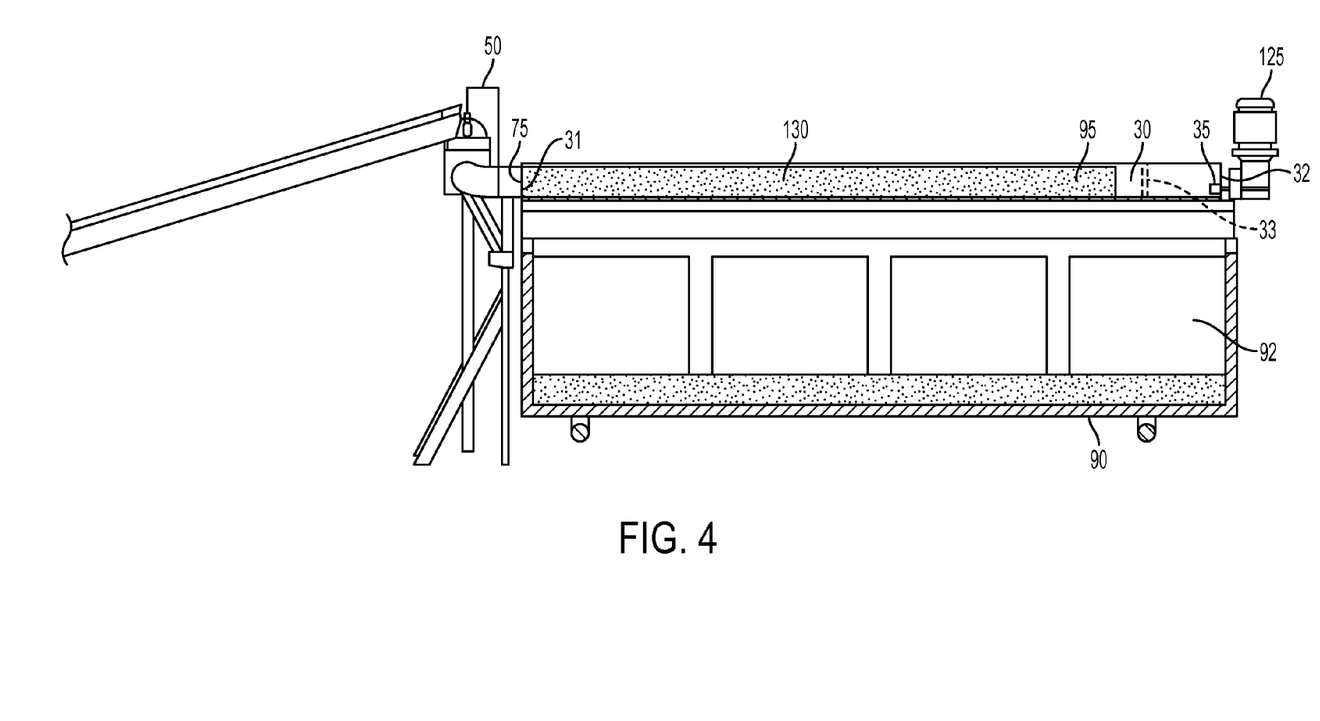
FIG. 4 is a cross-sectional side view of the overhead material handling system of FIG. 1 with expelled compacted material within the trough.
Figure 5A:
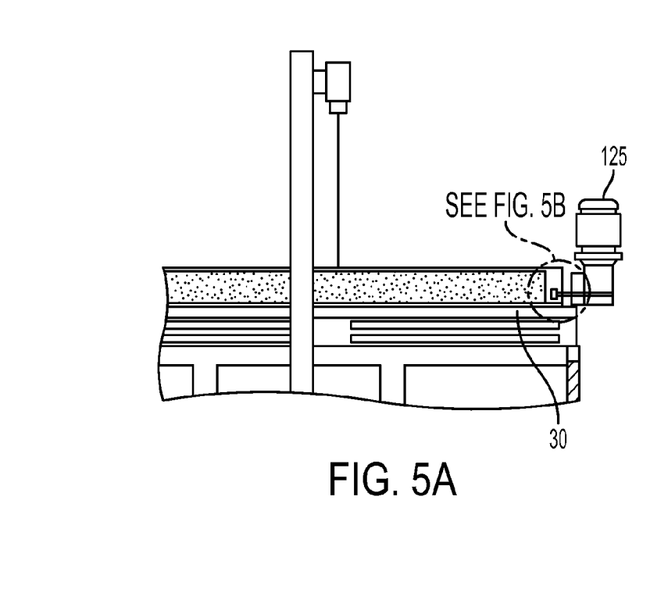
FIG. 5A is a detail cross-sectional side view of expelled compacted material within the trough of the material handling system of FIG. 1.
Figure 5B:
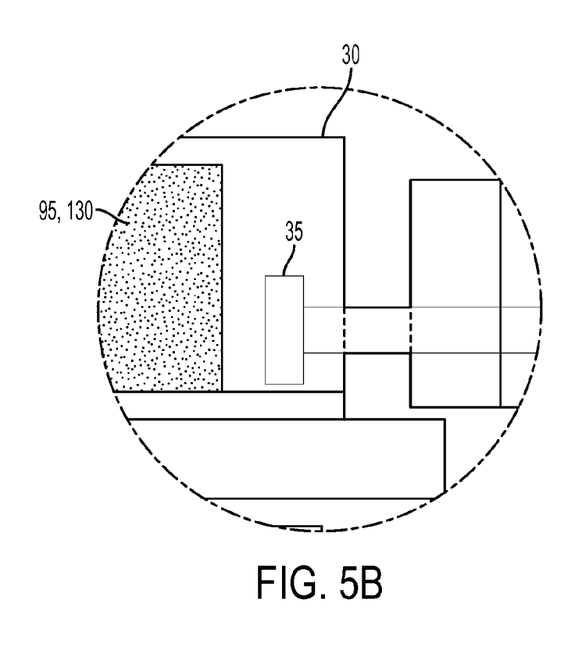
FIG. 5B is a detail cross-sectional side view of FIG. 5A showing the trigger of the material handling system of FIG. 1.
Figure 6:
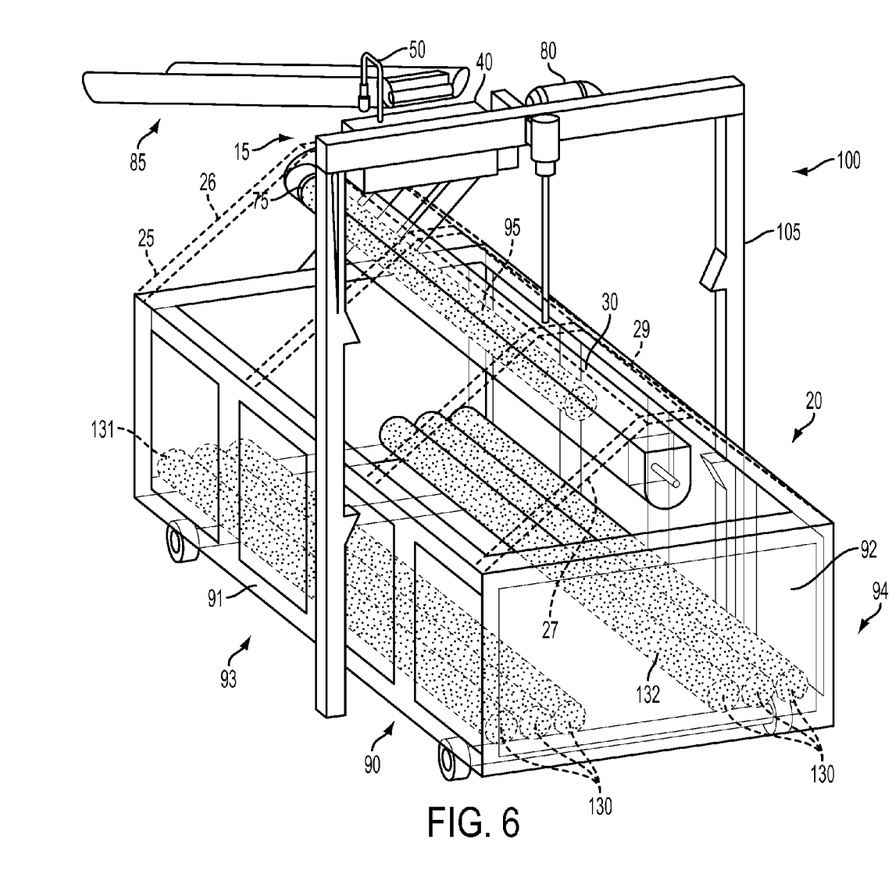
FIG. 6 is an isometric view of the overhead material handling system of FIG. 1 with expelled compacted material in the form of a plurality of continuous logs discharged in the container.
Figure 7:
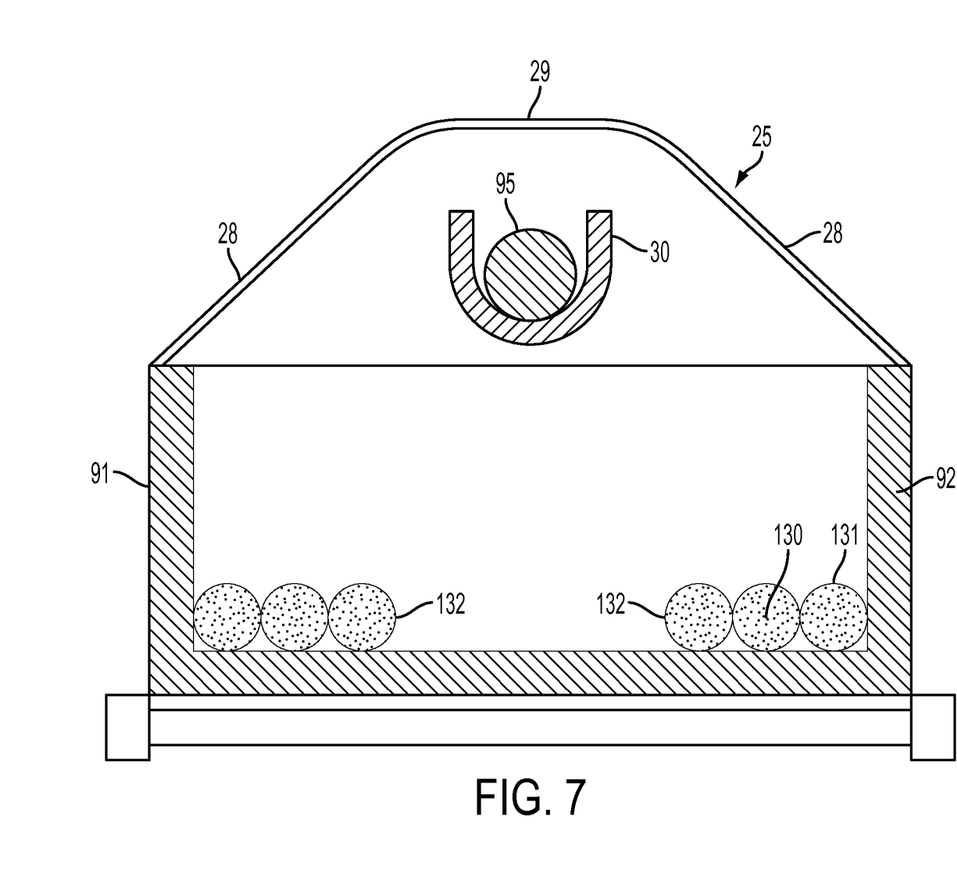
FIG. 7 is a cross-sectional end view of the overhead material handling system of FIG. 1 showing the cover in the form of a frustum along its length in this embodiment.

As used herein, a "leveler" 20 comprises (i) a cover 25, (ii) a trough 30, and (iii) a trigger 35. As shown in FIG. 6, the cover 25 comprises four sidewalls 28 and a top surface 29 that is coupled to each sidewall 28. The cover 25 further has a first end 26 and a second end 27. The top surface 29 of the cover 25 may be flat (see FIG. 1), peaked, domed, or may bear the cross-section of a frustum along its length from the first end 26 to the second end 27 (see FIG. 6), for example. The first end 26 of the cover 25 also defines at least one input 24 through which the material may be transferred to the trough 30. The input 24 may be an opening, orifice, port, or open chute in the cover 25. The material may be deposited into the input 24 from the compactor portion's outlet 75.

In some example embodiments, the cover 25 may comprise a fabric coated in polyvinyl chloride (pvc). In other embodiments, the cover 25 may be made from steel, such as a stainless steel. Other materials for the cover 25 are also possible. The cover 25 allows for pest and odor control and prevents the exposure of material within the container 90 to the exterior environment. The cover 25 also serves as a barrier from the afore-mentioned exposure, thus increasing the safety of the personnel operating the overhead material handling system 10.

The cover 25 may further define inspection ports and material level sensor (not shown) in one or both of the top surface 29 or sidewalls 28 to aid in the placement of the leveler 20 on the container 90 or to inspect a mechanical failure and/or the contents of the container 90. These inspection ports may comprise slideable panels, hinge-mounted doors, or inlets made of clear plastic, such as Plexiglass. In some examples, the input 24 may serve as both an inspection port and as an opening through which material 95 can be fed.

The trough 30 is a traditional U-shaped trough made from a rigid material, for example carbon or stainless steel, aluminum or polymeric material. The trough 30 may be reinforced along its length with ribs 33 disposed on the trough's exterior to prevent twisting along its length. The trough 30 has a first end 31 and a second end 32 and is rotatably-mounted between corresponding first and second ends 26, 27 of the cover 25. In one embodiment, the trough's first end 26 is connected to a shaft and bearing or to a rotating coupling, while the trough's second end 27 is mounted to a drive shaft. The drive shaft in turn is coupled to shafted gear reducer and motor. The shafted gear reducer and motor impart torque to the trough 30 causing it to rotate in one of a first or a second direction. Alternatively, hydraulic pistons or electric actuators may be used, for example, to cause rotation of the trough 30.

In another embodiment, the base of the trough 30 is mounted on a shaft having first and second ends. Here, the first and second ends of the shaft may be optionally mounted within roller bearings.

In another embodiment (not shown), the first end 31 and second end 32 of the trough 30 are each coupled to two guide posts. These guide posts are located at opposing sides of the top of the U-Shaped cross-section and extend longitudinally beyond the first and second ends 31, 32 of the trough 30. Here, the first end 26 and the second end 27 of the cover 25 each define a guiding channel that is arc shaped or substantially circular to mimic the path of rotation of the trough 30. The two guideposts at the first end 31 of the trough 30 are disposed within the guiding channel defined in the first end 26 of the cover 25, while the two guideposts at the second end 32 of the trough 30 are disposed within the guiding channel defined in the second end 27 of the cover 25. The guideposts and guiding channels stabilize the ends of the trough 31, 32 to help prevent the trough 30 from twisting along its length when torque is applied by the drive shaft or other translation means, for example, hydraulic pistons or electric actuators. The shaft and guide post embodiments may be used in combination or in isolation. In the embodiment in which the guideposts are used in isolation, the drive shaft is coupled to at least one of the guideposts at the second end 32 of the trough 30.

The trigger 35 is used to sense the presence of expelled compacted material 95 at or near the second end 32 of the trough 30 and to trigger rotation of the trough 30 in one of a first or a second direction towards the respective sidewalls 91, 92 of the container 90. In one embodiment shown in FIGS. 5A and 5B, the trigger 35 includes a moveable plunger 35, wherein the trigger 35 is axially mounted within the trough 30 at the second end 32 and is biased by a spring in the direction of the first end 31. While the trigger 35 is preferably axially mounted, it may be off-center from the trough's axis, as long as the trigger 35 is disposed in the path of the expelled compacted material. In this embodiment, the plunger trigger 35 is axially displaced a distance, preferably in the range of about ¼ inch to sixes inches, by the expelled compacted material 95 toward the second end 27 of the cover 25 until the plunger trigger 35 engages an electrical or mechanical switch, for example by completing an electrical circuit or by releasing a spring-loaded drive mechanism. When the switch is engaged, the trough 30 rotates from an upright position about its base toward one of the sidewalls 91, 92 of the container 90 to unload the expelled compacted material 95 into the container 90. The trough 30 then returns to its upright position.

Directional rotation of the trough may be directed by a counter relay in a computer operated electronic control panel. The counter relay counts clockwise/counterclockwise rotation in one of the first and second directions and sends a signal to a reversing motor starter to return the trough 30 to its upright position.

In another embodiment, the leveler 20 may further comprise a counterweight that extends along a longitudinal length of the base of the trough 30. When the trough 30 has moved from its upright position to its discharge position, the counterweight is raised in the air and gravity then causes the counterweight to fall, bringing the trough 30 back to the upright position.

In an alternative embodiment (not shown), the trigger 35 comprises a sensor disposed at the second end 32 of the trough 30. The sensor may comprise a proximity sensor able to detect the presence of nearby objects without any physical contact, such as an optical sensor, a light sensor, or an imaging sensor, for example. The proximity sensor may be disposed within the trough 30 or may be alternatively coupled to the top surface 29 of the cover 25. The sensor alternatively may be of a type that requires direct contact with the expelled compacted material 95, such as a pressure sensor or a load cell, disposed on the base of the trough 30. When this direct-contact sensor is triggered it sends an electrical signal to the switch, as discussed above, to cause the rotation of the trough 30 to discharge the expelled compacted material 95 into the container 90.

In one embodiment, the overhead material handling system 10 includes a support structure 100 pivotally supporting the cover 25 and configured to move the leveler 20 between a raised position and a lowered position, that positions the leveler 20 substantially parallel to the container 90. The support structure 100 is positioned a distance away from the first end 26 of the cover 25, and in some examples may be positioned near the second end 27 of the cover 25. The support structure 100 includes a support frame 105 and an attachment mechanism 110 for removable attachment to the cover 25. The attachment mechanism 110 may include at least one chain hoist or pull-cord that is attachable to at least one eyebolt or other attachment mechanism on the top surface 29 of the cover 25. In some examples, the support frame 100 may include a framework of beams, posts, and corner braces.

In one embodiment, the overhead material handling system 10 includes at least one mechanical lifting mechanism 115 coupled to the cover 25. The mechanical lifting system may include a hydraulic system. The hydraulic system may include hydraulic pistons that are coupled to the first end 26 of the cover 25 and are configured to pivot the cover 25 about the first end 26. In operation, the cover 25 pivots upwards about the axis at the first end 26, such that the second end 27 is positioned higher than the first end 26. In this position, the second end 27 is further away from the container 90, allowing the container 90 to be tilted upwards for placement onto the truck 120. The support structure may further include a cover guide designed to prevent the cover from moving side to side, which can damage the pivot attachment. A beam structure supports the hydraulic system and positions the hydraulic system so that it can be properly coupled to the cover 25 to enable for the pivoting movement of the cover 25. A computing system may execute instructions to cause the hydraulic system to pivot the cover 25. Alternatively, an operator or other personnel may direct the power of the hydraulic system to pivot the cover 25. The hydraulic system may pivot the cover 25 along the various axes to position the cover 25 in a number of different locations. In some examples, sensors may be positioned on the cover 25 to aid in the detection and determination of the position and movement of the cover 25. In some example embodiments, ultrasonic sensors may be used as level indicating devices to detect and determine the position of the cover 25. In some examples, a shutoff switch may also be included. The shutoff switch may be located under the cover to sense that a cover has been separated from the container and subsequently halt all mechanical operations and alert a system operator of the issue.

In another embodiment, the mechanical lifting mechanism 115 could comprise floor jacking screws. In still another embodiment, the mechanical lifting mechanism 115 could raise the cover vertically through an attachment mechanism coupled to the four corners of the cover.

As used herein, a "container" 90 may be any open-top container, and may include wheels and a hitch at either end to facilitate transportation on and off of the roll-off container truck 120 or another vehicle. The container 90 may include sidewalls and a bottom that define an interior, wherein the interior is an upwardly open space. The container 110 preferably includes wheels attached to the bottom.

The roll-off container truck 120 may be any standard roll-off container truck known in the art. In an alternative example, the truck may comprise a vehicle towing a bed on which the container 90 may be loaded. Still other alternative examples may be envisioned.

In one embodiment, the overhead material handling system 10 includes a vent system 125 and an air filtration system in communication with the vent system 125. The combination of the vent system 125 and the air filtration system is configured to reduce odor buildup from within the container 90. The vent system 125 is shown coupled to the cover 25. The air filtration system is coupled to the vent system 125 and may include odor control features commonly used in the art. For example, scrubbers may be used that pull odor from various locations and "scrub" the odor by forcing air through a vessel containing different media to eliminate or mitigate odorous air build up within the container 90. Air filtration system could be carbon based, filter based or biological based.

In another embodiment, the handling system 10 may further include a guide rail and a stopping plate for ease of positioning the container 90 under the cover 25.

In a second aspect, a method is provided for loading and evenly distributing material into a container 90 using the overhead material handling system 10 described with reference to FIGS. 1-7, where the method comprises: (a) moving, compacting and dewatering material in the compactor 17, (b) expelling compacted material 95 into the first end 31 of the trough 30, (c) driving expelled compacted material 95 along the length of the trough 30 toward the second end 32 of the trough 30, (d) activating the trigger 35, (e) rotating the trough 30 in a first direction from an upright position toward a first side 93 of a container 90, (f) emptying the material 95 from the trough 30 into the first side 93 of the container 90, (g) returning the trough 30 to the upright position, (h) repeating steps (a) to (d), (i) rotating the trough 30 in a second direction from the upright position toward a second side 94 of the container 90, and (j) emptying the material 95 from the trough 30 into the second side 94 of the container 90.

In practice, discharging the compacted material into the container 90 in a rotating side-to-side manner allows the compacted material to be evenly distributed and loaded in an efficient manner. Further, the rotating mechanism could be programmed to discharge the material a certain number of times to the first side of the container 90 and then a certain number of times to the second side of the container 90 to achieve a full layer of material on the bottom of the container 90. The process is then repeated to achieve the next layer, and so on until the container 90 is filled to a desired level.

In one embodiment, driving the expelled compacted material 95 along the length of the trough 30 toward the second end 32 of the trough 30 comprises continuously expelling compacted material 95 into the first end 31 of the trough 30 such that the compacted material 95 is forced along a base of the trough 30.

In a preferred embodiment, the expelled compacted material 95 is in the form of a substantially continuous log 130. The log 130 is preferably circular in cross-section, but any polygonal cross-section is contemplated, as long as the shape does not impede the log 130 from rolling along the base of the container 90 or along the top surface 131 of a plurality of previously expelled logs 130 (see FIGS. 6-7).

In a preferred embodiment, after the material 95 has been emptied from the trough 30, the method further provides rolling the expelled material along one of a base of the container 90 or a top surface 131 of previously expelled compacted logs 130 until the expelled material reaches one of the first side 93 of the container 90, the second side 94 of the container 90, or a side of a previously expelled compacted log 132.

In a preferred embodiment, activating the trigger 35 comprises applying a force to a plunger 35 via the expelled compacted material 95. In an alternative embodiment, activating the trigger 35 comprises sensing the expelled compacted material via a sensor of a type discussed above with respect to the overhead material handling system 10 described in connection with FIGS. 1-7.

In operation, the steps of the method are repeated until the container is substantially full. When the container 90 is filled with the desired amount of material 95 or to capacity (this can be determined by using the inspection ports previously discussed, by using sensor technology or other alternative means), the flow of expelled compacted material 95 is stopped and the cover 25 is lifted using either the mechanical lifting mechanism 115, the support structure 110, or both, and the container 90 is moved onto a bed of a truck 120 or other vehicle. Another container may then be placed under the overhead material handling system 10, and the cover 25 may be lowered to position the handling system 10 to again deposit material into the container. Further, multiple levelers and containers may work in series or parallel in instances in which solid material is highly concentrated or there is a lack of operator availability, for example. In operation, a sensor or weigh cell may determine that a particular container is full and sends a signal for a feed discharge gate to close while opening another feed discharge gate to allow materials to move forward to the next container(s) until full containers can replaced with empty containers.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

We claim:

1. An overhead material handling system comprising:
   a compactor; and
   a leveler in communication with the compactor, wherein the leveler comprises a cover, a trough, and a trigger, wherein the trough has a first end and a second end and the trough is rotatably-mounted between a first end of the cover and a second end of the cover, wherein the trigger comprises a sensor disposed at the second end of the trough.

2. The system of claim 1, wherein the trough is mounted on a shaft.

3. The system of claim 2, wherein a first end of the shaft and a second end of the shaft are each mounted in a roller bearing.

4. The system of claim 1, wherein the trigger comprises a moveable plunger, and wherein the trigger is axially mounted within the trough at the second end of the trough.

5. The system of claim 1, wherein the cover comprises four sidewalls and a top surface coupled to each sidewall, wherein the top surface of the cover is flat, peaked or domed.

6. An overhead material handling system comprising:
   a compactor;
   a leveler in communication with the compactor, wherein the leveler comprises a cover, a trough, and a trigger, wherein the trough has a first end and a second end and the trough is rotatably-mounted between a first end of the cover and a second end of the cover; and
   a washer, wherein the washer comprises a tank, a screw, a drive unit, at least one spray nozzle, a water discharge conduit, and a material discharge outlet, and wherein the compactor comprises an inlet, a housing, motorized compacting means for moving, compacting and dewatering materials within the housing, a water discharge conduit and an outlet, wherein the inlet of the compactor is coupled to the material discharge outlet of the washer, and wherein the outlet of the compactor is coupled to one or both of the first end of the trough or the first end of the cover.

7. An overhead material handling system comprising:
a compactor;
a leveler in communication with the compactor, wherein the leveler comprises a cover, a trough, and a trigger, wherein the trough has a first end and a second end and the trough is rotatably-mounted between a first end of the cover and a second end of the cover; and
a feeding conveyor system for material transport in communication with the compactor; and
a support structure pivotally supporting the cover and configured to move the leveler between a raised position and a lowered position, wherein in the lowered position the leveler is substantially parallel to a container.

8. The system of claim 1, further comprising:
at least one mechanical lifting mechanism coupled to the cover.

9. The system of claim 1, wherein the cover defines inspection ports.

10. The system of claim 1, further comprising:
a vent system, wherein the vent system is configured to reduce odor buildup from within a container, and wherein the vent system is coupled to the cover.

11. A method for loading and evenly distributing material into a container using an overhead material handling system comprising: a compactor; and a leveler in communication with the compactor, wherein the leveler comprises a cover, a trough, and a trigger, wherein the trough has a first end and a second end and the trough is rotatably-mounted between a first end of the cover and a second end of the cover, wherein the trigger comprises a sensor disposed at the second end of the trough, the method comprising:
(a) moving, compacting and dewatering material in the compactor;
(b) expelling compacted material into the first end of the trough;
(c) driving expelled compacted material along the length of the trough toward the second end of the trough;
(d) activating the trigger;
(e) rotating the trough in a first direction from an upright position toward a first side of a container;
(f) emptying the material from the trough into the first side of the container;
(g) returning the trough to the upright position;
(h) repeating steps (a) to (d);
(i) rotating the trough in a second direction from the upright position toward a second side of the container; and
(j) emptying the material from the trough into the second side of the container.

12. The method of claim 11, wherein the expelled compacted material is in the form of a substantially continuous log.

13. The method of claim 12, further comprising:
rolling the expelled material along one of a base of the container or a top surface of previously expelled compacted logs until the expelled material reaches one of the container's first side, the container's second side or a side of a previously expelled compacted log.

14. The method of claim 11, wherein driving the expelled compacted material along the length of the trough toward the second end of the trough comprises:
continuously expelling compacted material into the first end of the trough such that the compacted material is forced along a base of the trough.

15. The method of claim 11, further comprising repeating the steps of claim 14 until the container is substantially full.

16. The method of claim 11, wherein activating the trigger comprises applying a force to a plunger via the expelled compacted material.

17. The method of claim 11, wherein activating the trigger comprises sensing the expelled compacted material via the sensor.

* * * * *